May 24, 1932.  E. V. DE BLIEUX  1,860,175
TWO-PHASE CIRCUIT CONNECTION FOR VAPOR ELECTRIC DEVICES
Filed Aug. 27, 1931
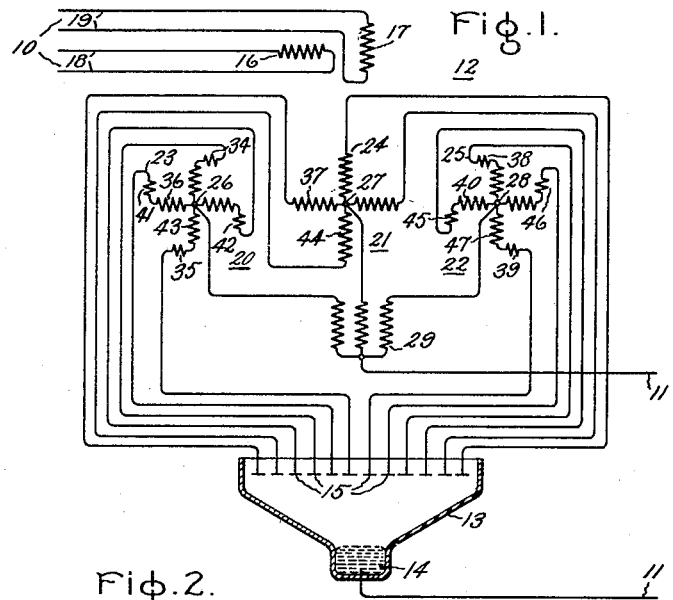
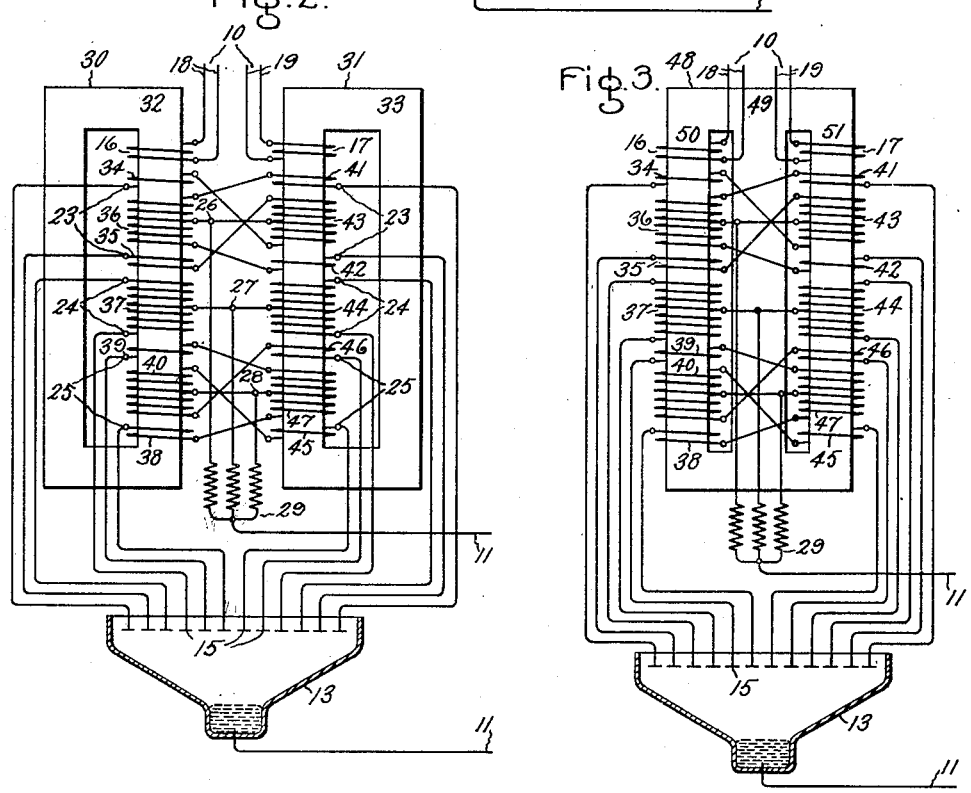
Inventor:
Earl V. DeBlieux,
by Charles E. Mullen
His Attorney.

Patented May 24, 1932

1,860,175

UNITED STATES PATENT OFFICE

EARL VERNE DE BLIEUX, OF PITTSFIELD, MASSACHUSETTS, ASSIGNOR TO GENERAL ELECTRIC COMPANY, A CORPORATION OF NEW YORK

TWO-PHASE CIRCUIT CONNECTION FOR VAPOR ELECTRIC DEVICES

Application filed August 27, 1931. Serial No. 559,737.

My invention relates to the transmission of power between direct and two-phase alternating current circuits through a vapor electric device such as the mercury arc rectifier or inverter, particularly to transformer apparatus for connecting the vapor electric device to the two-phase circuit, and has for its principal object the provision of improved transformer means for this purpose.

It is usual practice in transferring power in large amounts between alternating and direct current circuits to employ high capacity mercury arc rectifiers or inverters which are provided with twelve anodes connected for twelve-phase operation to the alternating current circuit. The latter circuit in such power systems is usually three-phase and the transformer means commonly used for connecting the circuit to the rectifier or inverter comprises suitable three-phase primary windings and suitable secondaries for phase multiplication to the required number of phases.

When, however, the alternating current circuit to which the vapor electric device is to be connected is two-phase, different transformer arrangements from those employed with the three-phase circuits are required. It has been proposed in the past to meet this requirement by the provision of transformer arrangements in which, for example, six-phase star-connected secondaries with two anodes connected to each secondary, are retained but in which the primaries are constituted by windings so arranged that the resulting transformer system is adapted to connect the vapor electric device to a two-phase instead of a three-phase circuit. Therefore, in this and similar transformer arrangements the advantages of twelve-phase connection is lost and primaries of special form for winding on the same three-legged transformer cores as the six-phase secondaries must be provided.

In accordance with my invention, however, in the transformer means through which the twelve-phase vapor electric device is connected to a two-phase circuit, primary windings of special form are not employed, the primary phase windings being of the usual simple form. This result is attained by providing secondary windings so interconnected that they form three four-phase star-connected secondary systems or groups, each group being connected to a group of four of the twelve anodes, and the neutral points of the three groups of secondary windings being connected by an interphase transformer to the direct current circuit.

My invention will be better understood from the following description when considered in connection with the accompanying drawings and its scope will be pointed out in the appended claims.

Referring to the drawings, Fig. 1 is a diagrammatic representation of a system in which power is transferred between a two-phase alternating current circuit and a direct current circuit in accordance with my invention, and Figs. 2 and 3 illustrate respectively different arrangements of transformer means shown in vector diagram in Fig. 1.

In the system represented in Fig. 1 power is transferred between a two-phase alternating current circuit 10 and a direct current circuit 11 through transformer means 12 and a vapor electric device 13 which in the present embodiment of the invention is a twelve-phase rectifier having a cathode 14 and anodes 15.

In accordance with my invention transformer means 12 comprises two primary windings 16, 17 each connected to a different phase 18, 19 of the two-phase circuit 10, and three four-phase secondary winding systems or groups 20, 21, 22, the end terminals of which 23, 24, 25, are connected respectively to groups of four of the anodes 15. In order to obtain twelve-phase operation of the rectifier 13, the windings of the three groups 20, 21, 22 are so disposed that the groups are displaced apart by thirty electrical degrees, groups 20 and 22 being provided for this purpose with zigzag windings and group 21 with main windings only. One lead of the direct current circuit 11 is connected to the cathode 14 and the other to the neutral points 26, 27, 28 of the secondary winding groups through an interphase transformer 29 having three windings.

In operation of the system illustrated in

Fig. 1 one third of the load on the system is carried independently by each of the three four-phase groups of secondary windings 20, 21, 22, the interphase transformer 29 operating to combine the output of these three groups, displaced apart by thirty degrees, into the direct current of circuit 11. The interphase transformer 29 assists in maintaining an equal division of load among the three secondary groups or systems and absorbs the difference in alternating voltage which results from the phase displacement of the three secondary systems.

In the illustration of the invention in Fig. 1 the transformer means is shown as comprising three four-phase secondary groups connected to the twelve anodes of a twelve-phase rectifier or inverter. It will be understood, however, that the invention is not limited to the three groups shown or to a twelve-phase vapor electric device, but that a different number than three, of four-phase secondary groups forming transformer means in cooperation with the phase windings 16, 17 of the two-phase circuit 10, may be utilized to connect the two-phase circuit to a vapor electric device having a correspondingly different number of anodes.

Thus four four-phase secondary groups similar to groups 20, 21, 22 and having suitable zig zag windings may be provided connected at their end terminals to sixteen anodes of a vapor electric device, these groups being displaced apart by twenty-two and one-half degrees. Or, in general, the secondary windings may comprise $n$ star-connected four-phase groups, the end terminals of each group being connected to four anodes of the $4n$ anodes of a vapor electric device, the $n$ groups of secondary windings being displaced apart by $$\frac{360}{n}$$

electrical degrees and the neutral points thereof being connected to the direct current circuit through an interphase transformer having $n$ windings.

In the arrangement illustrated in Fig. 2 of the transformer means shown in vector diagram in Fig. 1, the primary coils 16, 17 and the secondary coils comprised in the star-connected groups 20, 21, 22 constitute the windings of two separate single-phase to six-phase transformer 30, 31 including respectively cores 32, 33. On one of the cores, 32 is wound one of the isolated phase windings 16 of one phase 18 of the two-phase circuit 10, and on the same core are wound the corresponding phase windings of the secondary groups 20, 21, 22. These windings of the secondary groups wound on core 32 are stub coils 34, 35 and main coil 36 of group 20; main coil 37 of group 21; and stub coils 38, 39 and main coil 40 of group 22. On the other core, 33 are wound the other isolated phase winding 17 of the other phase 19 of two-phase circuit 10, and the corresponding phase windings of the secondary groups 20, 21, 22. The latter windings are stub coils 41, 42 and main coil 43 of group 20; main coil 44 of group 21; and stub coils 45, 46 and main coil 47 of group 22. The end terminals 23, 24, 25 of the secondary windings are connected to the anodes 15 of vapor electric device 13, and the neutral points 26, 27, 28 are connected through the three-winding interphase transformer 29 to the direct current circuit 11, as hereinbefore described in connection with the diagrammatic representation of the invention shown in Fig. 1.

The arrangement illustrated in Fig. 3 of the transformer means shown in vector diagram in Fig. 1 is the same in all respects as the transformer arrangement shown in Fig. 2 except that in Fig. 3 the transformer means includes a single two-phase to twelve-phase transformer 48 having a single 3 legged core 49. On one of the core legs, 50, are wound primary phase winding 16 of the two-phase circuit 10, and coils 34 to 40 of the secondary groups 20, 21, 22; on the other core leg, 51, are wound the other primary phase winding 17 of the two-phase circuit, and coils 41 to 47 of the secondary winding groups. These secondary windings are connected to anodes 15 of rectifier 13, and through interphase transformer 29 to direct current circuit 11, in the same manner as above set forth in connection with Figs. 1 and 2.

In the systems herein described for transmitting power between direct and two-phase alternating current circuits through a rectifier or inverter having twelve phases or a desired multiple of four-phases, it will be observed that the primary phases of the transformer means are isolated electrically from each other and that taps for required voltage adjustment may easily be provided on the isolated single primary coils. It will be observed further that the transformer secondary system constituted by the three four-phase groups of secondary windings provides an efficient twelve phase connection suitable for standard twelve-phase rectifiers ordinarily connected to three-phase circuits.

What I claim as new and desire to secure by Letters Patent of the United States, is:

1. In a system for transferring power between direct and two-phase alternating current circuits, a vapor electric device including a cathode and twelve anodes, a transformer having a primary connected to an isolated phase of said two-phase alternating current circuit, a second transformer having a primary connected to the other isolated phase of said two-phase circuit, three four-phase groups of windings constituting the secondaries of said transformers, each of said three groups being connected to a different group of said anodes, and an interphase transformer connected to said direct current circuit and having three windings each associated with a different one of said four-phase groups of windings.

2. In a system for transferring power between direct and two-phase alternating current circuits, a vapor electric device including a cathode and twelve anodes, a transformer having a primary connected to an isolated phase of said two-phase alternating current circuit, a second transformer connected to the other isolated phase of said two-phase circuit, three four-phase star-connected windings constituting the secondaries of said transformers, each of said star-connected groups of windings being displaced from any of the others by thirty electrical degrees, and an interphase transformer having three windings each connected to the neutral point of a different one of said star-connected groups of windings.

3. In a system for transferring power between a two-phase alternating current circuit and a direct current circuit, a vapor electric device including a cathode and twelve anodes, a transformer connecting said vapor electric device to said alternating current circuit, said transformer comprising two primary windings each connected to a different phase of said two-phase alternating current circuits and three four-phase star-connected secondary winding groups, each of said star-connected groups being connected to a different group of said anodes, and an interphase transformer having three windings each connected to the neutral point of a different one of said star-connected groups of secondary windings.

4. In a system for transferring power between a two-phase alternating current circuit and a direct current circuit, a vapor electric device including a cathode and twelve anodes, a transformer connecting said vapor electric device to said alternating current circuit, said transformer comprising two primary windings each connected to a different phase of said two-phase alternating current circuit and three four-phase star-connected secondary winding groups, each of said secondary winding groups being connected to a different group of said anodes, said star-connected groups of secondary windings being displaced apart by thirty electrical degrees, and an interphase transformer having three windings each connected to the neutral point to a different one of said four-phase star-connected winding groups.

5. In a system for transferring power between direct and two-phase alternating current circuits, a vapor electric device including a cathode and $4n$ anodes, transformer means comprising two primaries each connected to a different phase of said two-phase circuit and $n$ star-connected four-phase groups of secondary windings, each of said groups of secondary windings being connected to a different group of said anodes, and an interphase transformer having $n$ windings each connected to the neutral point of a different one of said $n$ four-phase groups of secondary windings.

6. In a system for transferring power between direct and two-phase alternating current circuits, a vapor electric device including a cathode and $4n$ anodes, transformer means comprising two primaries each connected to a different phase of said two-phase circuit and $n$ star-connected four-phase groups of secondary windings, each of said groups of secondary windings being connected to a different group of said anodes, said four-phase groups of secondary windings being displaced apart by $$\frac{360}{n}$$

electrical degrees, and an interphase transformer having $n$ windings each connected to the neutral point of a different one of said four-phase groups of secondary windings.

7. The combination of direct and two-phase alternating current circuits, a vapor electric device adapted to transfer power between said circuits including a cathode and twelve anodes, means to connect said device to said two-phase circuit including two transformers each having a core and a primary wound thereon, each of said primaries being connected to different isolated phases of said two-phase circuit, three four-phase star-connected groups of secondary windings associated with said primary windings, each of said four-phase groups of secondary windings being connected to a different group of four of said anodes, said groups of secondary windings being so disposed on said cores that said groups are displaced apart by thirty electrical degrees, and an interphase transformer having three windings each connected to the neutral point of a different one of said star-connected groups of secondary windings.

8. The combination of a two-phase alternating current circuit, a direct current circuit, a vapor electric device adapted to transfer power between said circuits including a cathode and twelve anodes, means to connect said device to said two-phase circuit including a transformer having a core and two primaries wound thereon each connected to a different phase of said two-phase circuit, secondary windings wound on said core and arranged in three four-phase star-connected groups, each of said groups of secondary windings being connected to a different group of four of said anodes, the windings of said star-connected groups being so disposed that said groups are displaced apart by thirty electrical degrees, and an interphase transformer having three windings each connected to the neutral point of a different one of said groups of secondary windings.

9. The combination of direct and two-phase alternating current circuits, a vapor electric device adapted to transfer power between said circuits including a cathode and $4n$ anodes, means to connect said device to said two-phase circuit including two transformers each having a core and a primary wound thereon, each of said primaries being connected to different isolated phases of said two-phase circuit, $n$ four-phase star-connected groups of secondary windings associated with said primary windings, each of said four-phase groups of windings being connected to a different group of four of said anodes, said groups of secondary windings being so disposed on said cores that said groups displaced apart by $$\frac{360}{n}$$

electrical degrees, and an interphase transformer having $n$ windings each connected to the neutral point of a different one of said star-connected groups of secondary windings.

10. The combination of a two-phase alternating current circuit, a direct current circuit, a vapor electric device adapted to transfer power between said circuits including a cathode and $4n$ anodes, means to connect said device to said two-phase circuit including a transformer having a core and two primaries wound thereon each connected to a different phase of said two-phase circuit, secondary windings wound on said core and arranged in $n$ four-phase star-connected groups, each of said groups of secondary windings being connected to a different group of four of said $n$ anodes, the windings of said star-connected groups being so disposed on said core that said groups are displaced apart by $$\frac{360}{n}$$

electrical degrees, and an interphase transformer having three windings each connected to the neutral point of a different one of said star-connected groups.

In witness whereof I have hereunto set my hand.

EARL VERNE DE BLIEUX.